Dec. 30, 1941.          W. A. BEHRENS                 2,267,782
     METHOD OF AND APPARATUS FOR MAKING SLIDE FASTENER STRINGERS
                    Filed Nov. 18, 1938           7 Sheets-Sheet 1

INVENTOR.
Walter A. Behrens
BY his   David J. Moriarty
                         ATTORNEY.

Dec. 30, 1941.  W. A. BEHRENS  2,267,782
METHOD OF AND APPARATUS FOR MAKING SLIDE FASTENER STRINGERS
Filed Nov. 18, 1938  7 Sheets—Sheet 2

INVENTOR.
Walter A Behrens
BY
his Don J Moscowitz
ATTORNEY.

Dec. 30, 1941.   W. A. BEHRENS   2,267,782
METHOD OF AND APPARATUS FOR MAKING SLIDE FASTENER STRINGERS
Filed Nov. 18, 1938   7 Sheets-Sheet 3

INVENTOR.
Walter A. Behrens
BY
his   ATTORNEY.

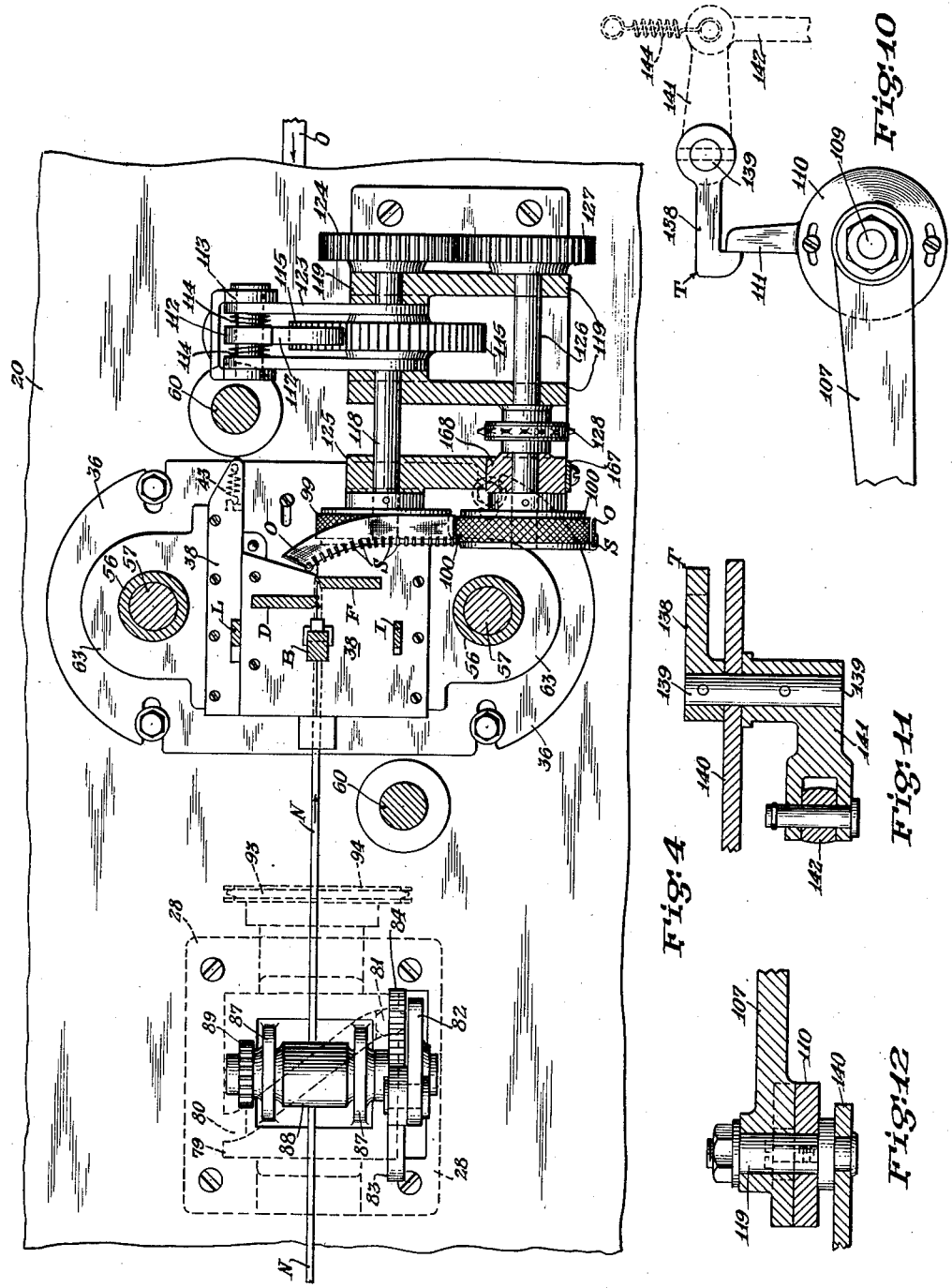

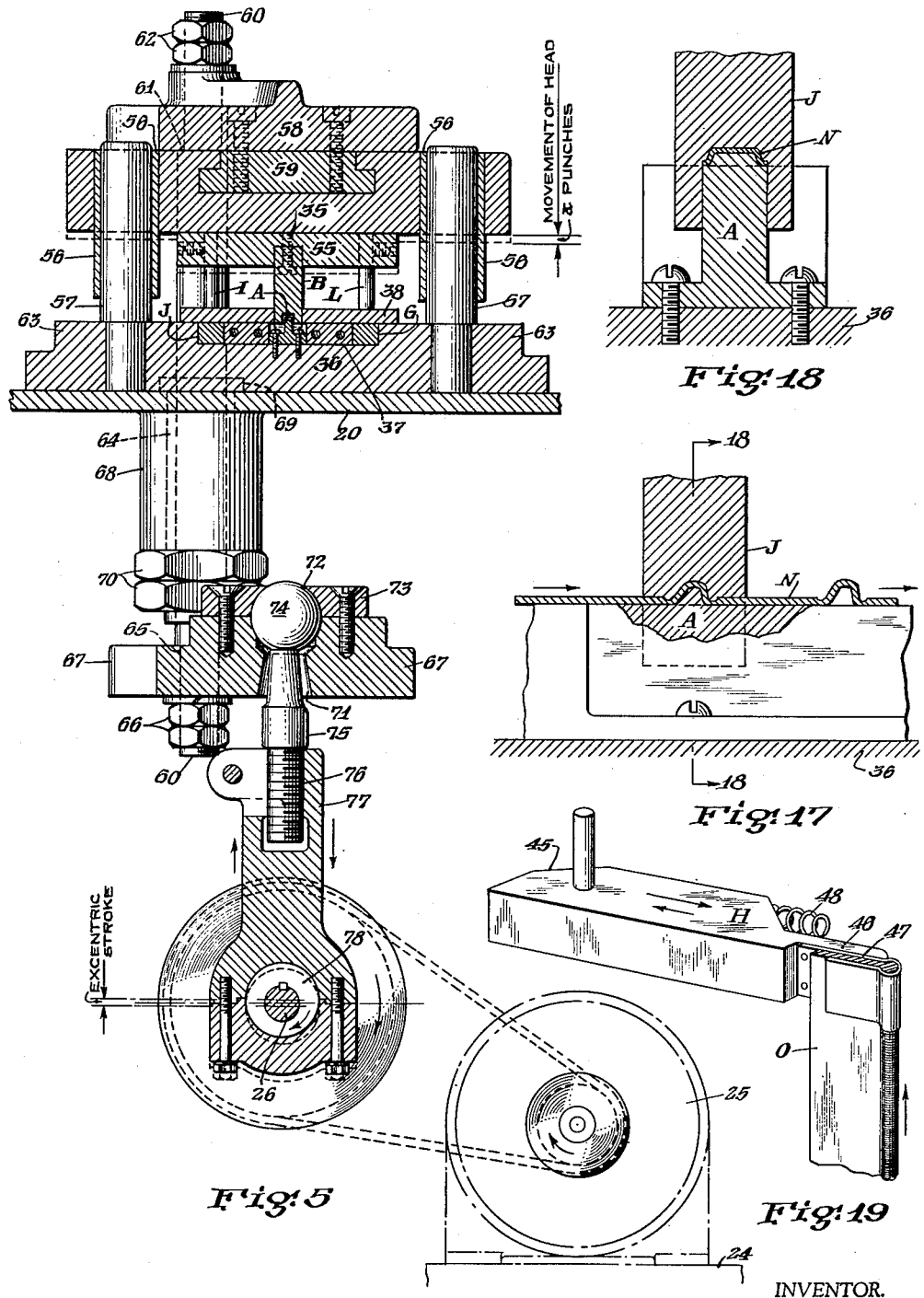

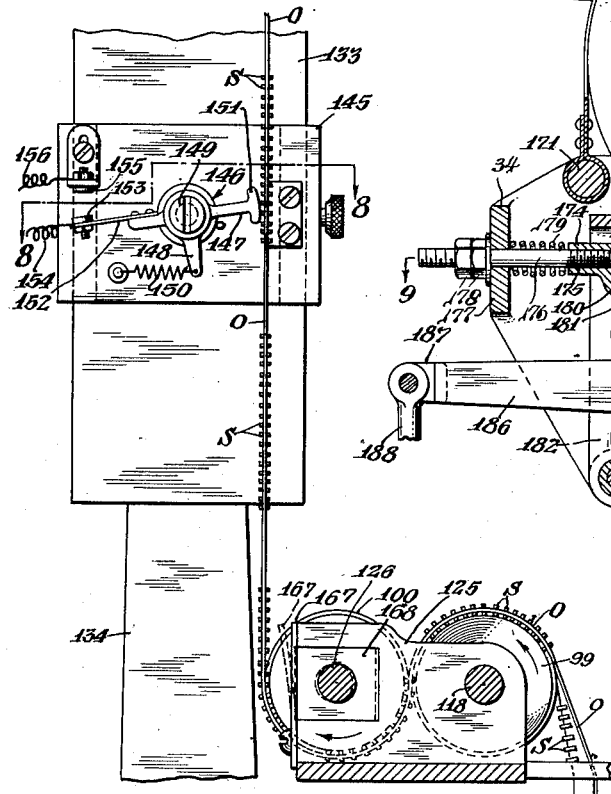

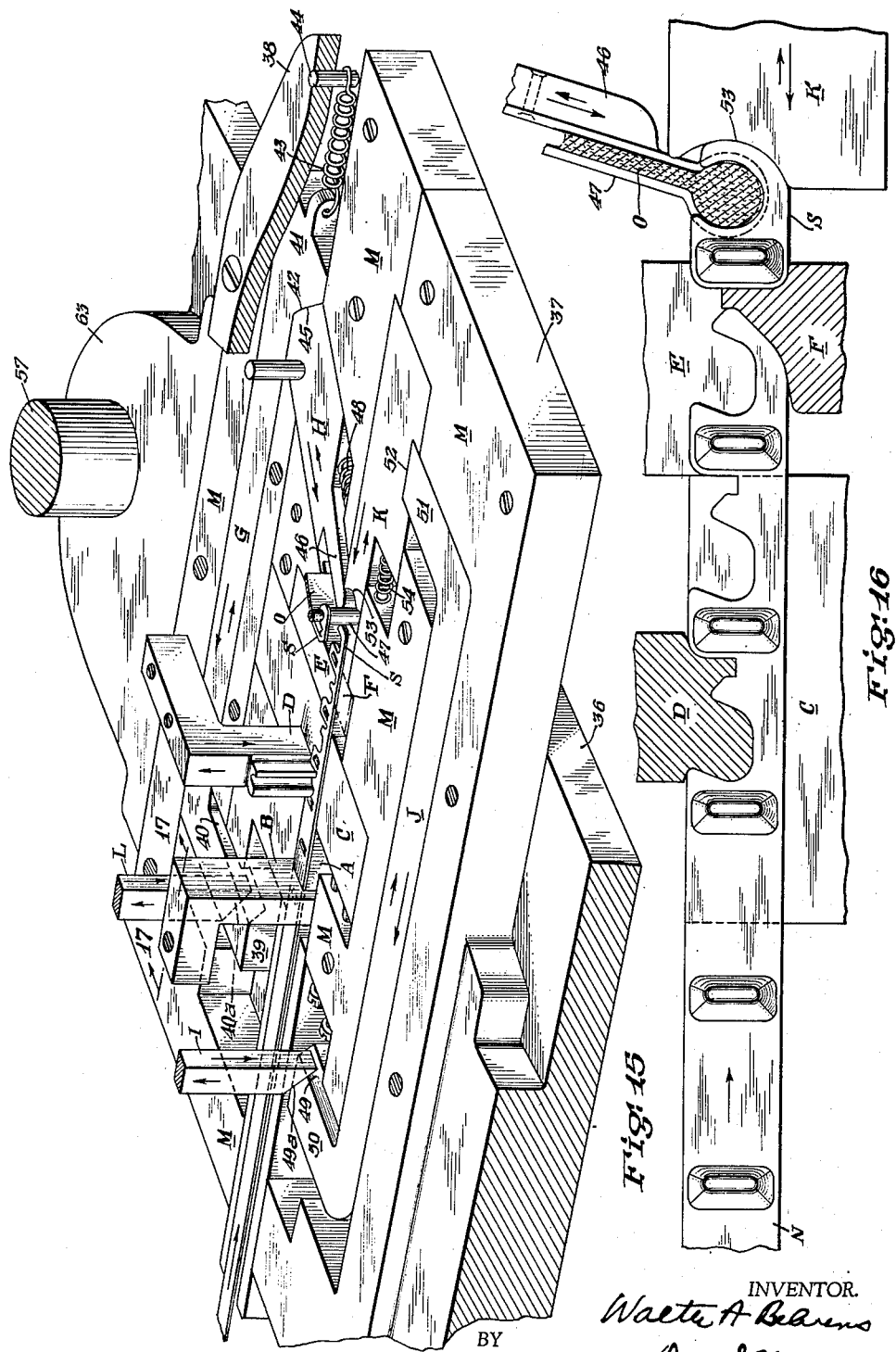

Patented Dec. 30, 1941

2,267,782

UNITED STATES PATENT OFFICE 2,267,782

METHOD OF AND APPARATUS FOR MAKING SLIDE FASTENER STRINGERS

Walter A. Behrens, New York, N. Y., assignor to Port Fastener Corporation, New York, N. Y., a corporation of Delaware Application November 18, 1938, Serial No. 241,195

12 Claims. (Cl. 153—1)

This invention relates to improvements in method of and apparatus for forming continuous slide fastener stringers.

Generally, it is an object of this invention to provide a novel method and apparatus of the so-called "scrapless" type for the manufacture of slide fastener stringers of the offset tape type, more particularly disclosed in the patents to Noel Poux, 1,817,837 and 1,817,839.

Broadly, it is an object of this invention to provide for a novel method and mechanism for intermittently mounting scoops onto a tape in spaced relationship and for periodically providing a separation zone between respective scoop series on the tape through the application of a completed stringer section as a control.

Specifically, it is an object of this invention to provide for the formation of a stringer incorporating offset scoops of the character shown in the patents to Noel Poux 1,817,837 and 1,817,839, wherein a continuous band of metal is progressively shaped to provide at the end thereof a scoop having head and spaced jaw portions extending transversely of the length of the band, and cooperating with said band there is provided an intermittently movable tape for successively mounting scoops, the tape during its period of rest and that of the band from intermittent feed, being displaceable transversely of its normal feed path into the jaws of the scoop at the end of the band; the scoop being clamped at its jaws to the tape, severed from the remainder of the metal band and the tape being returned to its position for intermittent feed during such period.

Further, it is an object of this invention to provide a novel tape feed and tape jump mechanism incorporating a member acting to intermittently impart a step by step movement to the tape, for mounting scoops in spaced relationship on the tape to form a series and at the completion of such series formation, to cause the tape, during the normal period of its intermittent movement, to attain a considerably greater displacement to provide the required spacing zone between the respective series, the timing for and the extent of the spacing zone effectuated on the tape by such member being controllable by and from a previously formed scoop series on the tape.

These and other advantages, capabilities and features of the invention will appear from the subjoined detailed description of one specific embodiment thereof illustrated in the accompanying drawings, in which Figure 1 is a side elevation of the apparatus for forming slide fastener stringers.

Figure 4 is a plan view taken in section along lines 4—4 of Figure 2.

Figure 5 is an end elevation taken in section along lines 5—5 of Figure 2.

Figure 6 is an end elevation taken in section along lines 6—6 of Figure 2.

Figure 7 is an end elevation in section taken along lines 7—7 of Figure 2.

Figure 8 is a plan view in section taken along lines 8—8 of Figure 7.

Figure 9 is a plan view in section taken along lines 9—9 of Figure 6.

Figure 10 is an end view taken along lines 10—10 of Figure 2.

Figure 11 is a plan view in section taken along lines 11—11 of Figure 1.

Figure 12 is a plan view in section taken along lines 12—12 of Figure 1.

Figure 15 is a perspective view of the punch head and die bed assembly partly cut out.

Figure 16 is a plan view partly in section showing the steps in the formation of a scoop on the continuous metal strip and the relations of the elements for producing the same.

Figure 17 is a front elevation in section taken along lines 17—17 of Figure 15, indicating the relation of the elements for providing the cupping effect on the metal strip as it progresses.

Figure 18 is an end elevation in section taken along lines 18—18 of Figure 17.

Figure 19 is a perspective view of the tape carrier block.

Figures 1, 13:
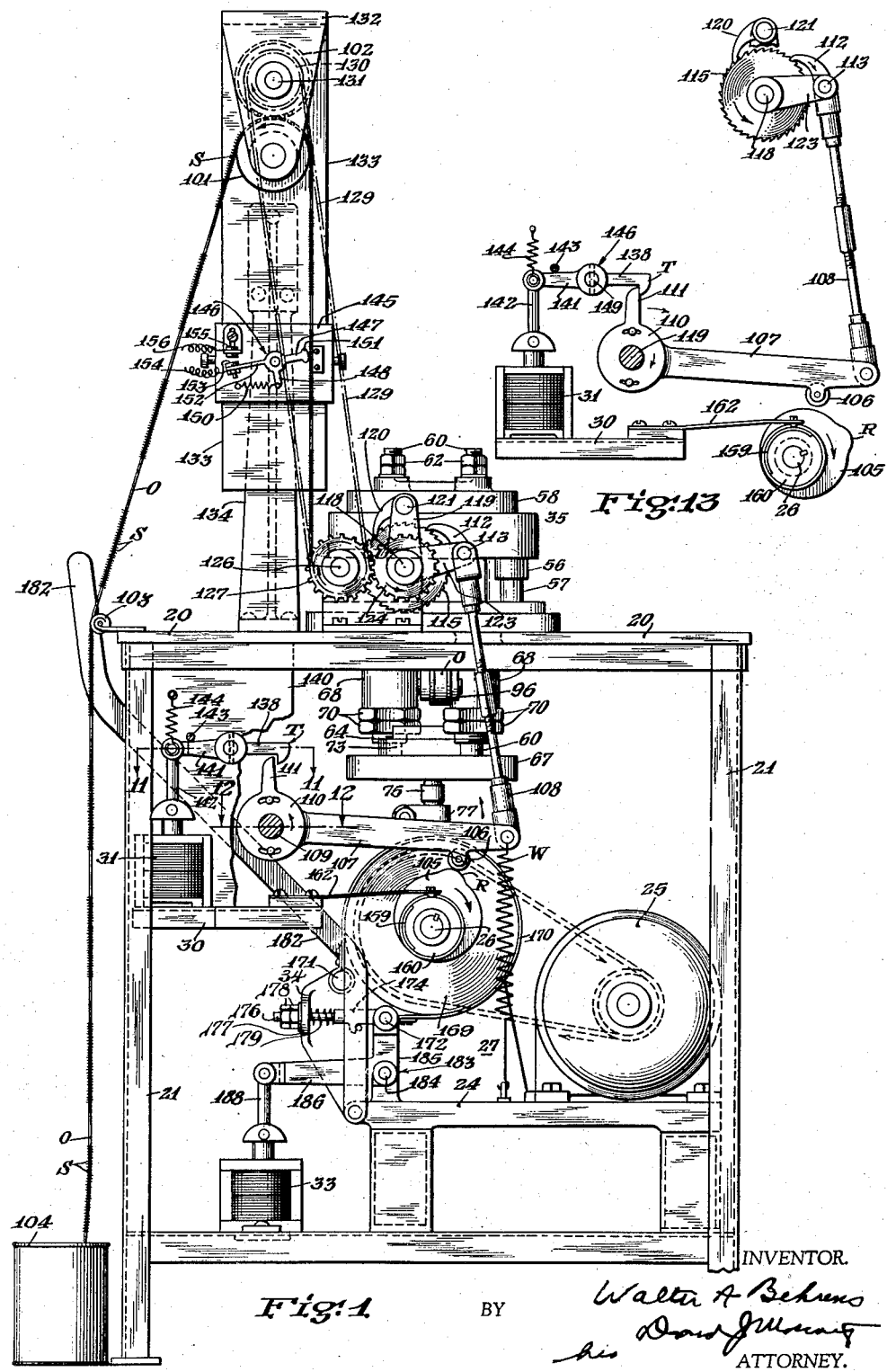
Figure 13 is an end elevation of the tape feed mechanism in the apparatus.
Figure 2:
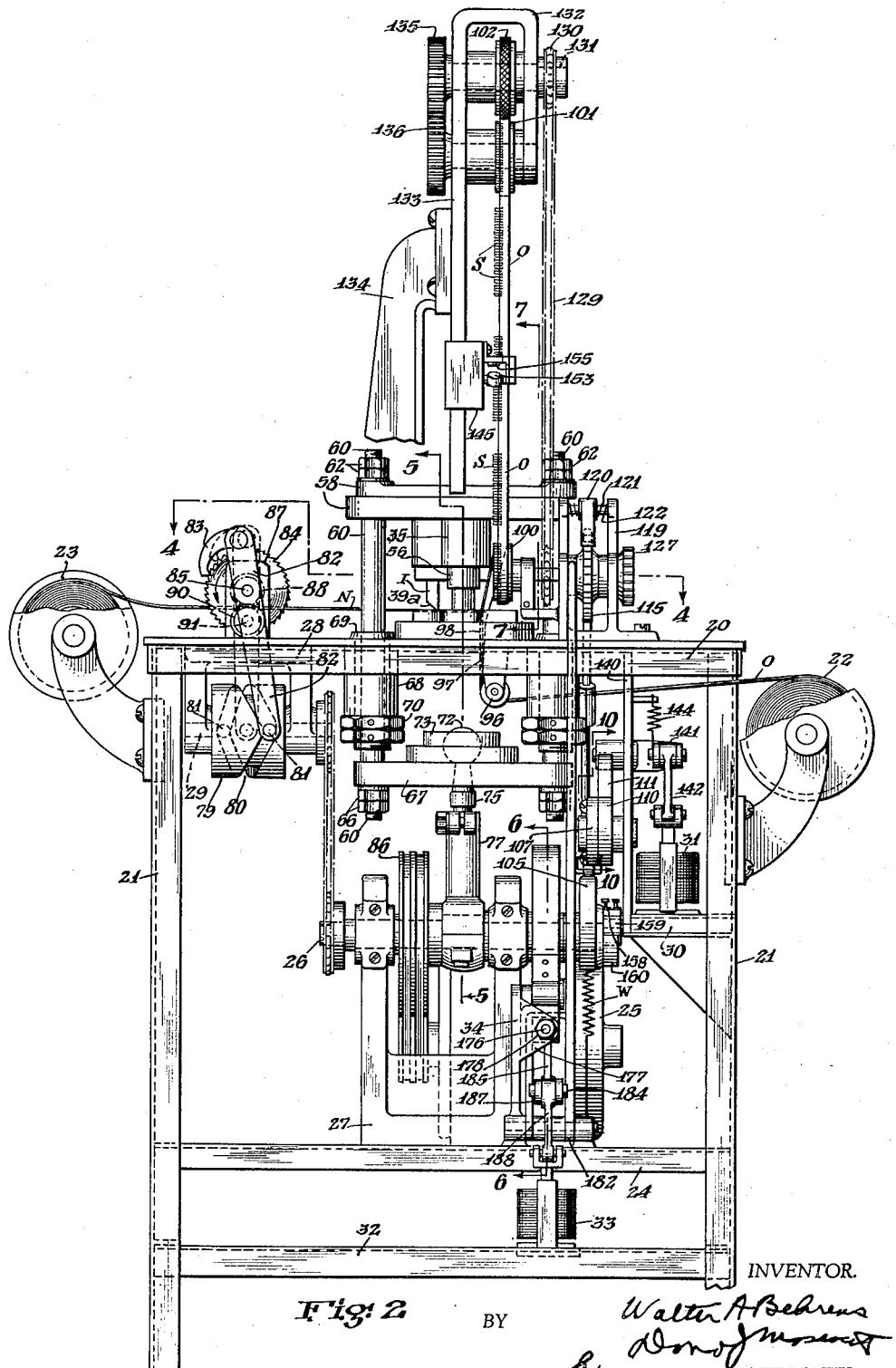
Figure 2 is a front elevation of the apparatus.
Figures 3, 14:
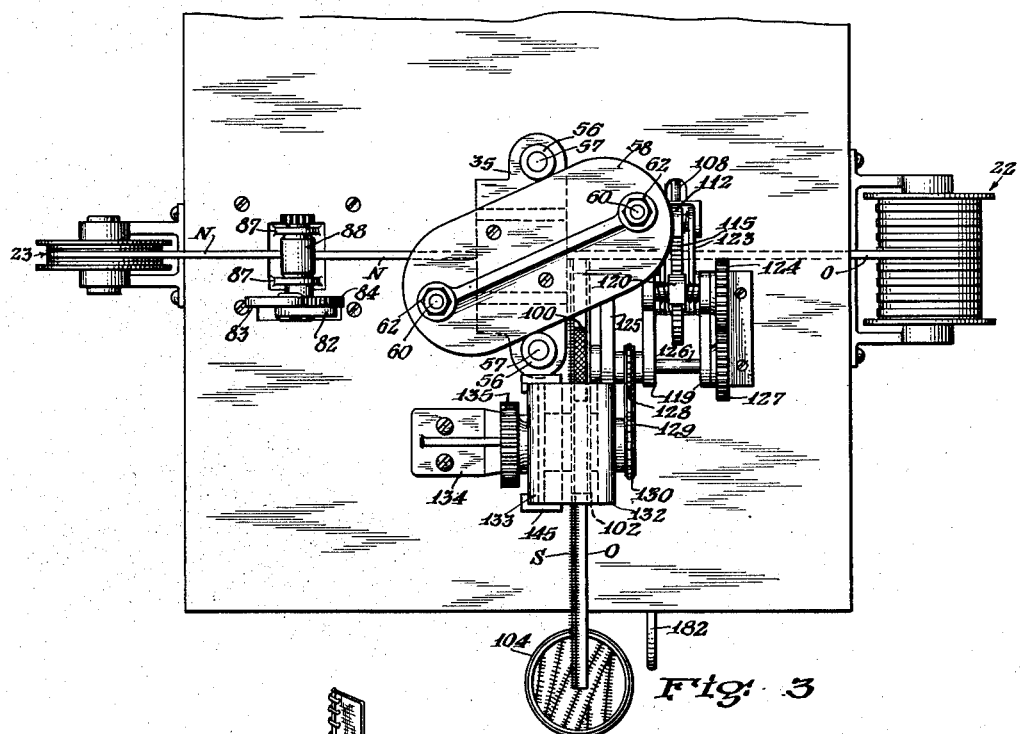
Figure 3 is a plan view of the apparatus.
Figure 14 is a diagrammatical view of the tape feed and tape jump mechanisms and the electrical connections associated therewith.

Referring to the drawings, the apparatus as shown in assembly in Figures 1 to 3 comprises (1) a metal feed; (2) a tape feed; (3) a stringer forming mechanism incorporating blanking and clamping members; (4) a jump tape feed mechanism; and (5) a brake mechanism, all of the above being operable from a common source of power and drive.

Referring in particular to the reference characters in the drawings, numeral 20 represents the table of the apparatus frame upon which are mounted the stringer forming mechanism and the tape feed and jump mechanisms. On opposing cross bars extending along legs 21 of the frame are mounted respectively brackets carrying the tape band roll 22 and the metal strip roll 23 for rotation. On ledge 24 above the base of the frame there is mounted motor 25, and the power shaft 26, operable through pulley 86 operable by belt V from the motor drive, is journalled in the arms of bracket 27, likewise supported on such ledge. On the arms of bracket 28 depending from table 20 there is mounted the metal strip feed shaft 29. On ledge 30 supported on one of the frame legs is mounted the solenoid 31 applied in the jump feed control, while on base 32 of the frame is disposed solenoid 33 applied in conjunction with the brake assembly mounted on bracket 34 upstanding on ledge 24.

The clamping and stamping assembly

Referring in detail to Figures 2, 4, 5 and 15 to 19, the blanking and clamping assembly in the stringer forming mechanism comprises a reciprocable male punch section 35 and a female die section 36 mounted on the table 20.

The female die section 37 resting in die bed 36, carries dies A, C and E; tape setting slide G controlling tape carrier block H, and scoop setting slide J controlling scoop clamping block K. A series of adjustable blocks M forms an external frame for the die section 36 and internal spacers for setting the dies A, C and E; and provides guideways for the slides G and J, the tape carrier block H, and the scoop clamping block K; the aforesaid elements of the die section being assembled into locked unit readily insertable and removable from the die bed.

On die section 37 there is mounted cover plate 38 having framed therein slots through which pass the shearing punches and slide control plungers of the male punch section, the construction and operation of which will be later described.

The tape setting slide G is of U configuration, having on its longer leg 39 a bevel formation 40, on its shorter leg 41 a cam formation 42, the free end of the body having attached thereto one end of a tension spring 43, the other end of which is attached to pin 44 depending from die cover plate 38. The cam face 42 of tape setting slide G cooperates with cam face 45 of tape carrier block H, at the neck 46 of which is mounted vertically depending tape guide 47 formed in the nature of a U shaped stamping having a spherical base to accommodate the bead of the tape, the upper edge of which is disposed below the upper surface of the movable and fixed elements of the female die, as shown in the enlarged view at the right of Figure 16. A compression spring 48 is mounted between spacer block M and a shoulder of carrier block H, being supported on pins (not shown) extending from such blocks.

The tape clamping slide J is of U configuration and has a bevel formation 49 on the upper surface of one of its legs 50, the free end of its other leg 51 being firmly set within groove 52 of clamp block K, whose punch end has the curved contour 53, as shown in enlarged form at the right of Figure 16. Compression spring 54 is disposed between spacer block M and a shoulder of clamp block K, said spring being mounted on pins extending therefrom (not shown).

The details of the upper or punch male die 55 carried on punch head 35 forming part of the blanking and setting mechanism is best illustrated in Figures 4, 5 and 6 to 18. The male punch die 55 has firmly mounted thereon and depending therefrom cupping and drawing punch B, cutting punch D, cutting punch F, and actuating plungers I and L, which two last punches, having contact surfaces 40a and 49a of approximately 45°, serve to displace respectively the tape setting slide G and the scoop clamping slide J in the direction of the larger arrow (Figure 15), by virtue of the pressure sliding cooperation of such contact surfaces 40a and 49a with the bevels 40 and 49 of the slides on the down stroke of the punch head 35. The contours and arrangement of the respective punches B, D and F and the slide actuating plungers I and L are best shown in section at the center of Figure 4.

At opposing ends of punch head 35 are formed guideways bounded by bushings 56, which surround and form bearing surfaces for the upstanding posts 57 firmly carried on female die bed 36.

The punch head is interlockingly attached to a carrier 58 therefor by the interlocking of wedge 59 of the former in a corresponding slot of the latter. From carrier 58 there depend at opposing ends, posts 60 shouldered as at 61, at the threaded ends of which lock nuts 62 firmly mount the same to the carrier, said posts being passed through guideways 63 in the female die bed 36 and bushings 64 extending from the die bed 36 through the table 20; the free end of posts 60 being shouldered as at 65 and attached to drive head 67 by lock nuts 66. Bushing 64 is enclosed in hub 68, which is welded to the underface of table 20, said bushing being maintained in position by its enlarged head 69 above the table 20 and the lock nuts 70 attached to the threaded ends thereof below the table 20.

The drive head 67 has a neck portion 71 merging into a spherical receiver 72 formed by cut outs in the drive head 67 and cover 73 therefor, in which rests ball 74 formed at the end of rod 75 and adjustably carried as at 76 at the end of connecting rod 77. The connecting rod 77 is driven at its other end by eccentric 78 carried on drive shaft 26.

Referring to Figure 16 there is illustrated in enlarged form the step by step effect of the punching dies on the metal strip N as, for example, the cupping, the shearing and the assembly and the clamping of the punched and sheared scoops S, onto the tape O.

The metal strip feed

The metal strip feed is shown in detail in Figures 2 to 4 inclusive. A cam 79 having an angularly disposed peripheral groove 80 is rotatably mounted on a shaft 29 carried on bracket 28 depending from table 20. Within the groove 80 there is disposed a cam follower 81 carried at one end of centrally pivoted connecting rod 82 extending through the table 20, the other end of such connecting rod carrying in offset relationship pivoted pawl 83. On the table 20 and to the rear of connecting rod 82 there is mounted ratchet wheel 84, the teeth of which are acted upon by the pawl 83. The ratchet wheel 84 is keyed to a horizontal shaft 85 mounted for rotation between upright support arms 87, said shaft carrying roller 88 and gear 89, likewise keyed thereto. A second roller 90 and a gear (not shown) meshing with gear 89 is keyed to shaft 91, which extends across support arms 87 and below roller 88.

The shaft carrying the grooved cam 79 is rotated by sprocket wheel 93 keyed thereto, said sprocket wheel being driven by chain 94 actuated by drive sprocket wheel 95 keyed to the main drive shaft 26.

As the main drive shaft 26 rotates, the rotary movement imparted to the grooved cam wheel 79 by virtue of the chain and sprocket connection to shaft 29 carrying the cam wheel, is translated into a horizontal displacement for the cam follower 80, and a corresponding horizontal translation of the connecting rod 82, and a step by step movement of the ratchet wheel 84 through actuation of the same by pawl 83; with the result that for each complete revolution of the grooved cam 79 there is imparted a full displacement of the pawl 83 involving pressure and riding on the teeth of ratchet wheel 84, thus imparting a step by step movement to the gear 89 and the roller 88 actuated thereby, while at the same time imparting a motion in opposite direction to the gear and roller on shaft 91, so that metal strip 23 is maintained in frictional contact between drive roller 88 and roller 90 is fed in a horizontal step by step movement between the male punch head 35 and the female die section 37.

*Operation of the stamping and clamping assembly*

Upon actuation of the eccentric 78 carried on shaft 26, connecting rod 77 attains a rotary reciprocation which is transmitted to the ball 74 carried on its spherical guideway in the drive head 67, whereupon posts 60 fixed thereto are reciprocated within guideways and sleeves 64, causing a reciprocation of the carrier 58 and punch head 35 in the amount indicated at the right of Figure 5, the male punch head being guided in its reciprocation by posts 57 upstanding from the female die bed 36.

Referring now to Figures 15 to 19 inclusive, wherein is shown the condition of the dies in the female die section 37, and the punches of the male punch head 35, the male punch head is in such figure shown on the upstroke, and all the moving parts therein are indicated as to their motion on the upstroke of the punch head by the shorter arrows, the longer arrows indicating the movement at the downstroke of the male punch head.

On the upstroke of the male punch head 35 punches B, D and F move away from the metal strip N, which passes in the direction of the arrow along the female die section 37, and likewise, control plungers I and L are retracted from contact with bevels 40 and 49 of the slides G and J, whereupon compression spring 54 displaces clamp black K in the direction of the shorter arrow carrying clamping surface 53 of the clamp block K out of contact with the last clamped scoop S, and displacing slide J in the direction of the longer arrow; while tension spring 43 draws slide G in the direction of the shorter arrow, releasing contact of the cam surface 42 of such slide with cam surface 45 of the tape carrier block H, permitting compression spring 48 acting on the block to expand and displace the block H in the direction of the shorter arrow away from clamping position, said carrier block at such time carrying the tape within the tape frame 47 away from the path of the moving metal strip N.

In the meantime, the punches in the male punch head 35 being free from the surface of the metal strip N, the latter is advanced by the advancing mechanism shown at the left in Figure 1.

Upon the downstroke of the male punch head 35 all the punches and plungers heretofore described with respect to Figures 15 to 19 are displaced in the direction of the longer arrow, with the result that as the cupping punch B cooperates with cupping die A to shape by drawing the meshing portion for the head of a scoop element being formed on a section of the strip, cutting punch D cooperates with cutting die C to form the tape receiving portion and partially shape the jaws of a scoop element being formed and cutting punch F cooperates with cutting die E to shape the free jaw of the scoop element being formed in the next adjacent section of the strip, while severing the fully formed scoop that has been clamped to the tape at the end-most section of the strip. In the meantime, plungers I and L in their downward movement act so that their sloped bases 40a and 49a contact with the bevelled surfaces 40 and 49 of the long arms of slides G and J, displacing them to the left in the direction of the longer arrow in Figure 15, with the result that, first tape carrier block H through the action of the cam 42 of slide G upon cam surface 42 thereof is moved in the direction of the longer arrow compressing spring 48, wherein the tape supported in guide 47 of the carrier H slides into the space between the jaws of the scoop at the end-most section of the strip (see the right of Figure 16), and immediately thereafter slide J in its displacement to the left causes movement of clamp punch K against compression spring 54, so that its clamp edge 53 acts to clamp the free jaw of the scoop against the tape (see the right of Figures 16), the formed scoop S at the end-most portion of the strip being maintained rigidly during the clamping step by virtue of the fact that the punch F at the down stroke of the punch head 35, having contacted with the upper face of the strip and commenced its shearing and severing action in conjunction with die E serves to prevent displacement to the left of the formed scoop as it is being clamped.

*The tape feed assembly*

The tape feed mechanism is shown in detail in Figures 1 to 4 inclusive, 7 and 8 and 10 to 14 inclusive. As shown in Figure 2, the tape O carried on roller 22 mounted on leg 21 of the frame passes under table 20 around bracketed support roller 96, vartically through a slit 97 in table 20, vertically through a slit 98 in female die bed 37, through guide 47, carried on slide block H, in which position it has scoops S applied thereto, and thence in an arcuate angular bend (Figure 4), over and around knurled wheel 99 and under and around knurled wheel 100 (Figures 4 and 6), over knurled wheel 101, under knurled wheel 102 (Figures 1 to 3), thence over roller 103 mounted at the edge of table 20 and into the collector 104.

To impart the step by step movement of the tape O, by virtue of which scoops S stamped from the metal band N are applied thereto in spaced relationship, and to impart the jump movement of the tape to provide the required spacing between series of grouped scoops; the following feed control mechanisms are applied:

Referring to Figures 1 to 4, eccentric 105 is mounted for rotation on main drive shaft 26, such eccentric having spacing cam R formed on its periphery. A roller 106 carried on rocking lever 107 is adapted to be contacted periodically by cam R of the eccentric 105 for causing a displacement of the rocking lever 107, as will be described. At one end of lever 107 and nearest to roller 106 there is pivotally attached adjustable drive lever 108, the same end having attached thereto a tensed spring W extending from ledge 24, the rocking lever 107 being mounted at its other end for rotation about fixed stud or shaft 109. To the longer arm of rocking lever 107 there is adjustably keyed a disc 110 having extending finger 111, to provide a bell crank effect. This finger 111 cooperates with electrically controlled locking pawl T whose function in the establishment of the jump of the tape will be later described in detail.

At the upper end of drive lever 108 there is disposed drive pawl 112 pivotally mounted on cross-rod 113 and spaced by torsion springs 114, for acting on the teeth of ratchet wheel 115 keyed to shaft 118, and supported for rotation in U support bracket 119. The pawl 112 is guided in its movement by spaced connecting bars 123 extending between lever 108 and shaft 118. A lock pawl 120 is pivotally carried on cross rod 121 mounted at the upper extremities of bracket 119, the pawl 120 being spaced on its cross rod by torsion springs 122.

At one end of shaft 118 there is keyed gear 124, while at the other end of said shaft 118, adjacent auxiliary bracket 125 there is keyed knurled wheel 99. On a second shaft 126 carried on bracket 119 there is mounted at one end gear 127 meshing with gear 124; while at the other end knurled wheel 100 is disposed opposite knurled wheel 99. Intermediate of the shaft 126 is mounted sprocket wheel 128 connected by chain 129 to sprocket wheel 130 carried on shaft 131 journaled in depending U bracket 132 formed at the free end of standard 133 carried by support 134. On shaft 131 within the bracket 132 is mounted knurled wheel 102 while at the outer end of said shaft is keyed gear 135, this gear being in mesh with gear 136 carried on shaft 137 journaled in bracket 132; the last named shaft carrying knurled wheel 101, which is spaced to cooperate with knurled wheel 102.

The tape jump assembly

Referring now to the tape jump mechanism in Figures 1 and 10 to 14, a rocking member comprising of one arm 138 carrying finger T is keyed to shaft 139 journaled on support plate 140 carried on the frame, the other arm 141 being keyed to shaft 139 on the other side of the plate 140; the last named arm 141 being bifurcated to carry pivoted plunger arm 142, forming at its free end the magnetizable element of the solenoid 31. A projection 143 limits the upward movement of arm 141, while tension spring 144 maintains arm 142 and the arm 138 keyed to the same shaft 139 forming the rocking member in substantially horizontal position, so that the finger T on the rocking member will normally lock finger 111 of the rocking lever 107 to limit the reciprocating stroke of rocking lever 107 to the displacement imparted thereto by the action of cam R of eccentric 105.

On the standard 133, there is slidably mounted plate 145 carrying the tape jump control member. This comprises bell crank lever 146 having its arms 147 and 148 at right angles to one another, said lever being pivoted on shaft 149 journaled on plate 145. The depending arm of bell crank lever 148 is connected at its free end to tension spring 150 carried on slide plate 145, while normally finger 151 at the free end of arm 147 of the bell crank lever 146 is in substantially angular position with respect to the horizontal against the tension of spring 150 by virtue of the pressure exercised thereagainst by the projecting jaws of the scoops S straddling the tape O.

Integral with the bell crank lever 146 and directly opposite arm 147 there is provided arm 152 carrying contact 153 having attached thereto one end of flexible conductor 154 leading to the winding of solenoid 31. On the slide plate 145 there is adjustably positioned fixed contact terminal 155 having attached thereto flexible conductor 156 leading to a terminal 157 of a switch assembly (Figure 14). A conductor 158 leads from terminal 157 to an arcuate segmental contact plate 159 forming a brush on control roller 160 carried at the extremity of shaft 26 adjacent eccentric 105. A conductor 162 leads from contact brush 159 to terminal 163 and from this terminal a conductor 164 leads to plug switch terminal 165, and from this plug switch a conductor 166 leads to the free end of the winding of solenoid 31.

The operation of the tape feed assembly

In operation of the feed and jump control mechanism, two or more groups of scoops are set up in spaced relationship by hand control of the stamping and clamping mechanisms until the free end of the tape O carrying the scoops S passes between the knurled wheels 101 and 102; and finger 151 of the bell crank lever 146 is at the uppermost scoop of a grouping.

The tape feed and jump control is then in the position shown in Figure 1. As shaft 26 is actuated by motor 25, the eccentric 105 carried thereby is rotated. As roller 106 on rocking lever 107 is contacted by cam R of the eccentric 105, the rocking lever 107 being positioned so that roller 106 can be normally contacted only by the cam R and not the remainder of the peripheral surface of the eccentric, the lever 107 is displaced upwardly about its pivot in the direction of the arrow in Figure 1, causing drive lever 108 carried thereby to move upwardly in the direction of the longer arrow, with the result that drive pawl 112 advances ratchet wheel 115 one notch in the direction of the arrow; as the cam R on the eccentric passes the roller 106 the levers 107 and 108 drop, causing drive pawl 112 to ride clockwise over the next lower notch on ratchet wheel 115, while holding pawl 120 maintains the wheel in position. As the eccentric rotates thus, drive pawl 112 is actuated through upward movement of the lever carrying the same only once during the revolution of the eccentric, and that only when the cam representing the point of greatest radius thereof contacts with the roller 106 on rocking lever 107. This step by step rotation of wheel 115 is transmitted through gear 124 on the same shaft 118 to gear 127 on shaft 126, with the result that knurled wheels 99 and 100 on the respective shafts 118 and 126 rotating in opposite directions and in frictional contact with the tape O carrying clamped scoops S, cause the tape to advance one space. Tractive tension is maintained between knurled wheels 99 and 100 by the pressure of leaf spring 167 on block 168, in which shaft 126 is journaled. The same step by step movement of the tape is maintained by and between knurled wheels 101 and 102 through actuation of the shafts carrying the same by the drive sprocket 128 on shaft 126 through chain 129 to sprocket 130 on shaft 131 to meshing gears 135 and 136.

As may be observed from Figures 1 and 13, the roller 106 does not normally contact with the eccentric 105, since rocking lever 107 carrying the roller is maintained by lock finger T at a distance therefrom, except that cam R contacts the same to give it a single upward movement sufficient to displace the drive rod 108 carrying pawl 112 to provide a single step movement of the ratchet wheel 115.

It is to be noted that the step by step displacement of the tape is controlled so as to be effectuated just as the male punch 35 moves upwardly and away from the female die, this motion being completed just before the male punch die returns to its downward movement.

Now referring to Figure 7, finger 151 is normally in pressure contact with the jaws of scoops S straddling the tape O (Figure 1). When the end of a group of scoops passes beyond the finger 151, the pressure thereagainst is removed, then spring 150 urges arm 148 in the direction of the longer arrow, causing the arm 147 carrying the finger 151 to approach the horizontal, whereupon arm 152 forming a continuation of the first named arm 147 is displaced towards the horizontal, causing circuit to be made between contacts 153 and 155 (see Figure 14), whereupon plunger 142 is drawn into solenoid 31 by its magnetization, resulting in the withdrawal of lock pawl T from contact with finger 111 of disc 110 keyed to rocking lever 107, whereby roller 106 thereon drops to ride on the peripheral surface of eccentric 105, with the result that as it rides along such surface and particularly from the arcuate segment thereof defining the longer to the shorter radius of the eccentric, the drive lever 108 carrying drive pawl 112, drops a distance equivalent to several teeth of the ratchet wheel 115, until the shortest radius of the eccentric is reached, after which the roller 106 is gradually urged upwardly as the radius of the eccentric increases until the cam R of the eccentric 105 contacts and passes the same, at which time the full displacement of the rocking lever 107 connecting lever 108 and drive pawl 112 carried thereon is attained; with the result that for a single rotation of the eccentric 105 and during the time the male punch is on its upstroke, the ratchet wheel 115 has imparted thereto a considerable rotary displacement and the tape is given a jump displacement, equivalent to the spacing required between groups of scoops. Since the amount of jump of the tape is determined by the movement of the drive pawl 112 and ratchet wheel 115, whose displacement is controlled by the difference between the shortest and longest radius of the eccentric 105; eccentrics of different formation may be applied to vary the stroke length for the equal step by step and jump feed of the tape.

Now, by this time the next series of scoops on the tape had approached finger 151 carried on the slide 145, causing displacement of such finger from the position of Figure 14 to that of Figure 1, as a result of which arm 152 is displaced in the direction of the arrow in Figure 1 and contact between elements 153 and 155 broken, thus breaking the circuit shown in Figure 14, releasing plunger 142 from the solenoid 31, whereupon spring 150 draws the lever 146 about its pivot, causing lock pawl T to drop into position against finger 111 of disc 110 to maintain rocking lever 107 in position wherein the normal peripheral surface of eccentric 105 is spaced from the roller (see Figure 13), and the eccentric will actuate the roller, the lever connected thereto and the drive pawl for step by step advancement of the drive pawl by contact of cam R with roller 106, as heretofore described.

Referring now to Figure 14, the wheel 160 carrying contact plate 159 in association with brush contacts 158 and 162 are adapted to break the above circuit at a predetermined period, namely, just as the male die punch is in its down stroke, so that no jamming of the machine may occur within the die punch assembly, in the event that any irregularity exists with respect to the tape carrying scoops and the finger 151 at the contact junction; the brush contacts 158 and 162 and plate 159 are proportioned in relation to the eccentric so that normally the contact made between the brush contacts 158 and 162 and plate 159 is broken, at the commencement of the down stroke of the male plunger head 35.

The brake assembly

Referring to Figures 1, 2, 6 and 9, on drive shaft 26 there is mounted brake drum 169, along whose periphery there passes brake band 170, one end of which is fixed to a pin 171, on a flange extending from bracket 34, and the other end of which is carried on pin 172, extending across the bifurcations 173 of the short arm 185 of bell crank lever to be later described. A block rod 174, mounted for horizontal displacement, is pivoted at one end on pin 172, said rod having a socket 175 into which is threaded rod 176 passing through a journalling slot in flange 177 formed on bracket 34. The free end of rod 176 carries a lock nut assembly 178, and a compression spring 179 is carried on the rod 176 between the flange 177 and the block 174.

The block 174 has a depending finger 180 which cooperates with pin 181 projecting from hand lever 182, so that normally spring 179 urging block 174 to the right maintains the depending finger 180 against the projecting pin 181, and also maintains the brake band 170 so that no tension is exerted thereby against the brake drum.

A bell crank lever 183 is mounted at 184 on ledge 24 to provide a pivotal mounting, the short arm 185 thereof being pivotally carried at its end on pin 172 of rod 174; the longer arm 186 of lever 183 has pivotally attached at its bifurcation 187, plunger rod 188 forming the magnetizable element of solenoid 33.

As current passes through solenoid 33, as controlled by a standard double throw switch, not shown, the plunger rod 188 is drawn into the solenoid, causing a downward displacement of lever arm 186 and a displacement to the left of lever arm 185, and block 174, and a compression of spring 179 whereupon the band 170 is tightened about drum 169 to restrain the movement of the same and the shaft 26.

The same action is imparted to the brake drum 169 and shaft 26 by drawing hand brake lever 182 to the left, since its projection 181 acting against finger 180 of the block 174 causes a displacement to the left (Figure 6), a compression of spring 179 and a tightening of the brake band about the drum.

When the braking action is terminated by releasing the mechanism controlled by solenoid 33 or the hand lever 182, dependent on which is applied, the spring 179, being released from compression, expands, bringing the elements of the brake assembly back to position shown in Figure 6.

It is obvious that various changes and modifications may be made to the details of construction without departing from the general spirit of the invention as set forth in the appended claims.

I claim:

1. In an apparatus for forming slide fastener stringers, a stationary bed and a movable head, a die and slide assembly in the bed and a punch and press assembly in the head, means for reciprocating said head, means for intermittently feeding a metal strip between the bed and head when the latter is moving away from the bed, a series of spaced punches on said movable head and spaced dies in said bed for shaping scoops having heads and spaced jaws on spaced sections of said metal strip, means for intermittently feeding a tape through said die bed as the head is moving away from the bed, and means actuable by presses in said movable head for successively inserting the edge of the tape between the jaws of the scoop and clamping the jaws of the scoop about the tape as the metal strip and tape are at a rest interval of their intermittent feed movement, and means on the movable head for severing the end-most scoop from the strip after the jaws of the same have been clamped to the tape.

2. In an apparatus for forming slide fastener stringers, a stationary bed and a movable head, a die and slide assembly in said bed, and a punch and press assembly in said head, means for reciprocating such head, means for intermittently feeding a metal strip over the die bed as the head is retracted from the bed, means for intermittently feeding a tape perpendicularly through said die bed as the head is retracted, said last two means being at rest as the head is advanced, punches on said head cooperating with dies in the die bed for progressively shaping sections of said strip on the die bed to form a scoop having a head and spaced jaws at the endmost section of the strip as the head is advanced, the slides in said die bed being actuable by presses in the head for successively laterally moving the tape between the jaws of the scoop at the end-most section of the strip and clamping the jaws of the scoop to the tape, as the head is advanced, and a punch on the head cooperating with a die on the bed for severing the clamped scoop from the strip.

3. In apparatus for producing the interlocking elements of slide fasteners; a bed; a member spaced from and movable towards and away from the bed; means for imparting to the member periodic movement towards and away from the bed; a single unitary assembly including dies, forming members, and punches for successive operations of forming a metallic strip into scoops to be attached to a tape for the manufacture of slide fasteners; the assembly including a base and a head, means for separably mounting the base in the bed; and means on head and member for interlocking engagement to locate the assembly in predetermined relation to the bed; the interlocking-engagement means and the separable mounting means being constructed so that the assembly can be separated as a unit from the apparatus, and can be relocated in the apparatus in said predetermined relation to the bed by interlocking said separable locking means and said interlocking-engagement means, respectively.

4. In a method for forming slide fastener stringers, wherein scoops are mounted in spaced relationship on a continuous tape, and pre-determined numbers of scoops separated by zones of relatively greater length than the spacing between individual scoops, through an intermittent feeding in step by step displacement of the tape following the mounting of scoops thereon, periodically interrupted by a displacement of the tape in a greater magnitude during one of its intermittent feed movements, said respective displacements being executed in equal time periods the step which consists in applying previously formed successive groups of scoops as the control for timing the commencement of the periodic feeding of greater magnitude of the tape and thereafter the return to periodic feeding of the tape in step by step displacement.

5. The combination with apparatus for forming slide fastener stringers by attaching slide fastener elements to a tape in groups of pre-determined length along the tape, the groups being separated by spaces of pre-determined length at which no elements are attached; including means for feeding a tape at regular time intervals, and means for attaching elements to the tape, the means for feeding the tape including means for producing a step-by-step movement during such regular time interval, cam actuated means included in the step-by-step-producing means, said cam actuated means being effective to produce movement of the tape-feeding means of pre-determined amplitude, and means for controlling the displacement of the cam actuated means at pre-determined intervals so that during a regular time interval it produces movement of the tape-feeding means of increased amplitude.

6. In a slide fastener stringer forming apparatus, a continuous tape, means for intermittently clamping scoops on said tape, intermittently reciprocating means acting subsequent to the intermittent clamping of the scoops on the tape in regular time intervals for advancing the tape in step by step movement, control means for limiting the stroke of the reciprocating means to provide a limited tape mount and a spaced mounting of the scoops on the tape, means periodically restraining the control means to permit said reciprocating means to impart during one of its reciprocations a stroke of greater extent than its limited stroke, whereby to provide a greater movement of the tape during a regular time interval and to establish series of spaced scoops having there-between a separating zone.

7. In a slide fastener stringer forming apparatus, a continuous tape, means for intermittently clamping scoops on said tape, intermittently reciprocating means acting subsequent to the intermittent clamping of the scoops on the tape for advancing the tape in step by step movement, control means for limiting the stroke of the reciprocating means to provide a limited tape movement and a spaced mounting of the scoops on the tape, means periodically restraining the control means to permit said reciprocating means to impart during one of its reciprocations a stroke of greater extent than its limited stroke, whereby to provide a greater movement of the tape and to establish series of spaced scoops having there-between a separating zone, and means cooperating with tape portions having groups of scoops mounted thereon and actuable by such scoops to control the timing and extent of the periodic enlarged stroke of said reciprocating means.

8. In a slide fastener stringer forming apparatus, a tape feed control comprising friction means gripping a tape therebetween, a ratchet wheel driving said friction means, a rod carrying a pawl acting on said ratchet wheel, a pivoted rocker member carrying said rod, drive means, a cam carried on said drive means, means maintaining said rocker member in a predetermined spaced relationship to said cam so that only a portion of said cam, as it rotates periodically contacts the same for reciprocating the rocker member, connecting rod and pawl, whereby to impart a step by step movement of said ratchet wheel, the friction means and the tape.

9. In a slide fastener stringer forming apparatus, a tape feed control comprising friction means gripping a tape therebetween, a ratchet wheel driving said friction means, a rod carrying a pawl acting on said ratchet wheel, a pivoted rocker member carrying said rod, drive means, a cam carried on said drive means, locking means maintaining said rocker member in spaced relationship to said cam so that only a surface portion thereof intermittently contacts the same for reciprocating the rocker member, connecting rod and pawl, to impart an equidistant step by step movement of said ratchet wheel, the friction means and the tape, and means releasing said locking means for periodically varying the distance between the rocker member and the cam for increasing the cam surface contacting with said rocker member, whereby the rocker member is reciprocated through a greater stroke than normally, and a movement of greater magnitude imparted to the ratchet wheel, friction means and the tape.

10. In a slide fastener stringer forming apparatus, a tape feed control comprising friction means gripping a tape therebetween, a ratchet wheel driving said friction wheels, a rod carrying a pawl acting on said ratchet wheel, a pivoted rocker member carrying said rod, drive means, a cam carried on said drive means, locking means maintaining said rocker member in spaced relationship to said cam so that only a portion thereof intermittently contacts the same for reciprocating the rocker member, connecting rod and pawl, whereby to impart an equidistant step by step movement of said ratchet wheel, the friction means and the tape, and means for periodically decreasing the distance between the rocker member and the cam for increasing the cam surface contacting with the rocker arm, whereby the rocker member is reciprocated through a greater stroke than normally, and a movement of greater magnitude imparted to the ratchet wheel, friction means and the tape, said means comprising an element resting against a section forming a part of the tape and carrying series of scoops separated by a spacing zone and adapted upon encountering the end of a scoop series to release the locking means, and upon encountering the beginning of the next successive scoop series to reset the locking means.

11. In a slide fastener stringer forming apparatus, means for intermittently clamping scoops on a continuous tape, intermittent reciprocating means acting on its advancing stroke subsequent to each intermittent clamping of the scoops on the tape for feeding the tape equidistantly in step by step movement, means normally acting on said reciprocating means for limiting the stroke thereof to provide an equidistant spaced mounting of the scoops on the tape, and means for periodically withdrawing the limiting means from coaction with said reciprocating means, whereby to permit an enlarged stroke thereof to provide a greater spacing between scoops, and a cam for driving said reciprocating means and having a surface contacting intermittently with the reciprocating means at either of its positions.

12. The combination with apparatus for forming slide fastener stringers by attaching slide fastener elements to a tape in groups of pre-determined length along the tape, the groups being separated by spaces of pre-determined length at which no elements are attached, including means for feeding a tape, and means for attaching elements to the tape, the means for feeding the tape including means for producing a step-by-step movement, cam actuated means included in the step-by-step-producing means, said cam actuated means being effective to produce movement of the tape-feeding means of pre-determined amplitude, and means for restraining the cam actuated means for a pre-determined period so that it produces movement of the tape-feeding means of decreased amplitude for the formation of a group, and means for releasing the restraining means at the end of the period of formation of a group to effect movement of the tape of greater amplitude to separate the formed group from a group to be formed.

WALTER A. BEHRENS.